Nov. 22, 1932.   A. L. McCABE   1,888,734
LIGHTING UNIT
Filed May 15, 1931    2 Sheets-Sheet 1
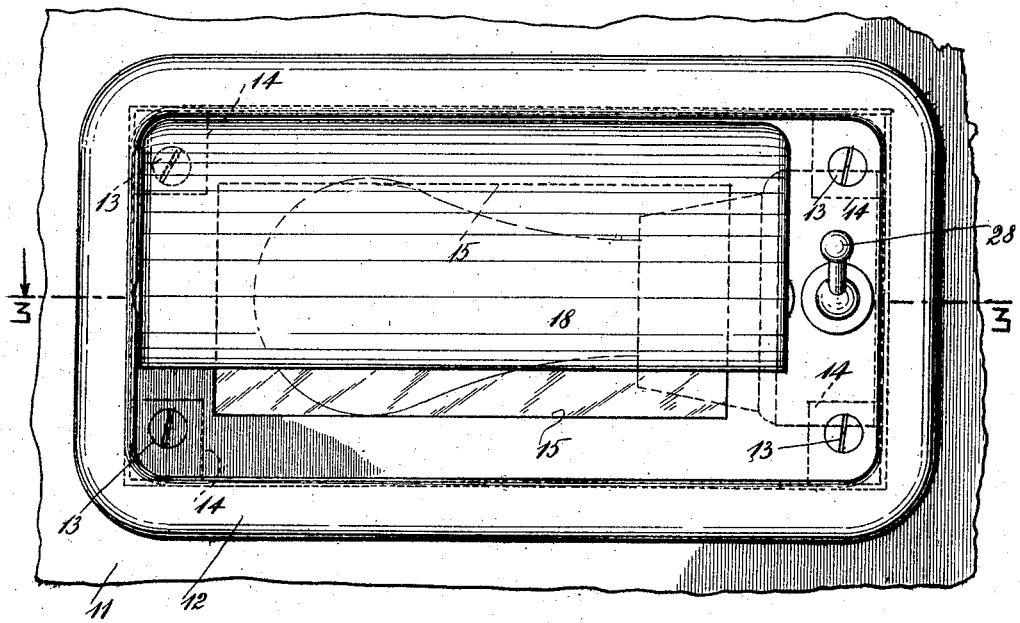
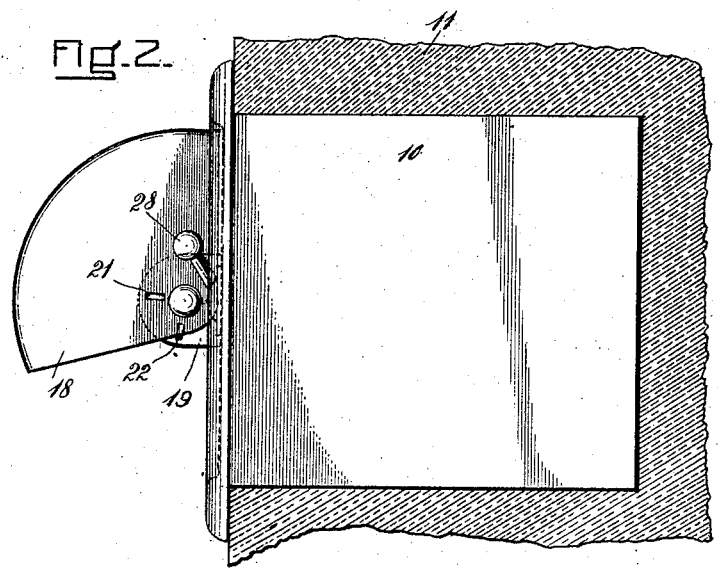
INVENTOR:
Anthony L. McCabe
BY Geo. K. Woodworth
ATTORNEY:

Nov. 22, 1932.  A. L. McCABE  1,888,734
LIGHTING UNIT
Filed May 15, 1931    2 Sheets-Sheet 2
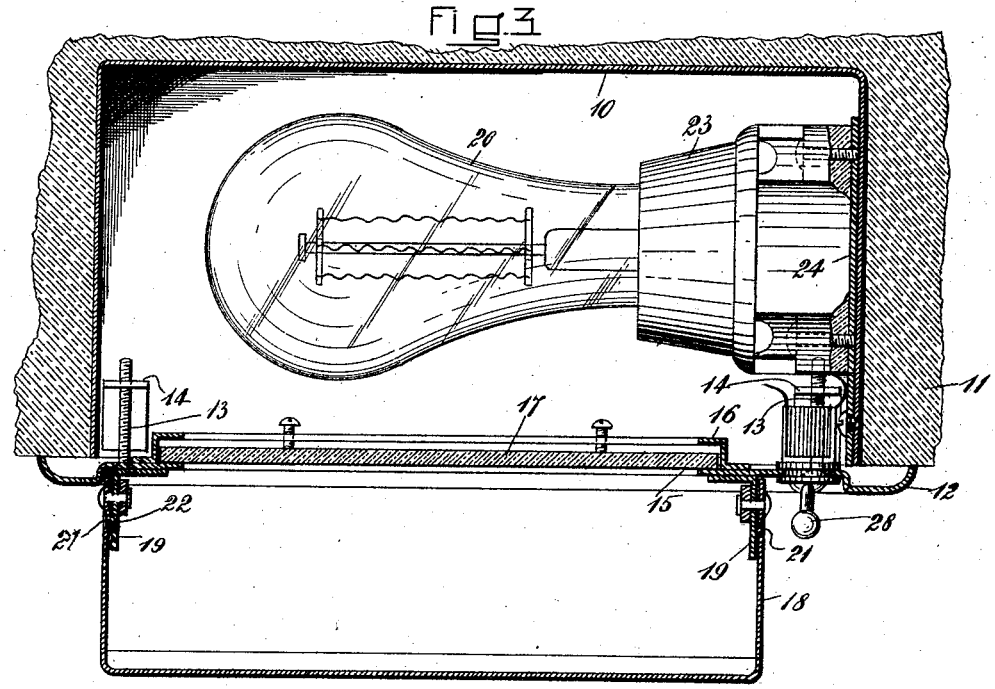
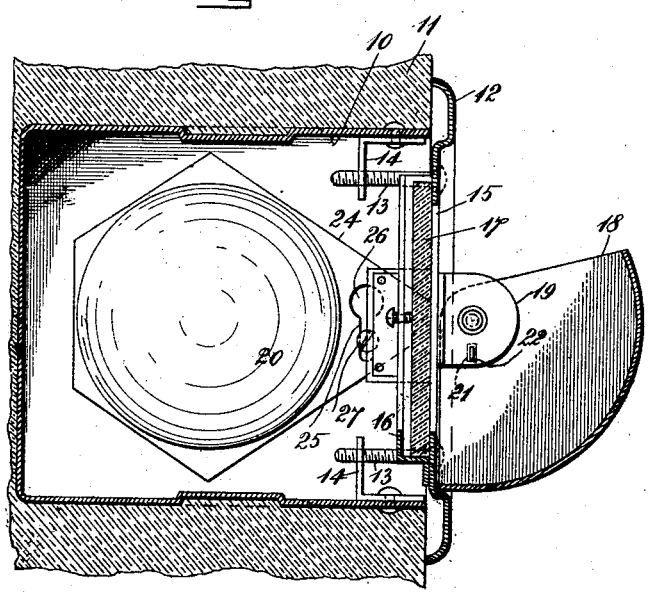
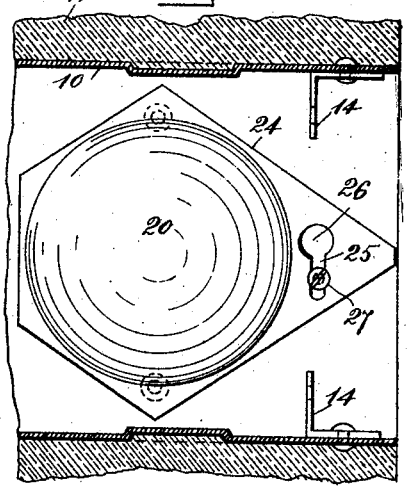
INVENTOR:
Anthony L. McCabe
BY Geo. K. Woodworth
ATTORNEY Patented Nov. 22, 1932

1,888,734

UNITED STATES PATENT OFFICE

ANTHONY L. McCABE, OF NEWTONVILLE, MASSACHUSETTS, ASSIGNOR TO ERIKSON ELECTRIC COMPANY, OF BOSTON, MASSACHUSETTS, A CORPORATION OF MASSACHUSETTS

LIGHTING UNIT

Application filed May 15, 1931. Serial No. 537,662.

The present invention relates to lighting units designed especially for use in hospitals and which may be used for lighting a bedside table or for low intensity indirect general illumination of the room merely by changing the position of an adjustable visor.

My invention comprises a casing which may be a wall box having an elongated opening in the front wall thereof, which front wall may be a removable face plate, and a visor pivotally connected to said front wall and co-extensive longitudinally with said opening, together with a friction lock or other suitable means for securing said visor in its uppermost position to reflect the light rays downwardly upon a bedside table or in its lowermost position to reflect said light rays upwardly for indirect general illumination.

In the drawings which accompany and form a part of this specification—

Figure 1 is a front elevation of a lighting unit involving my invention the visor being shown in its uppermost position;

Fig. 2 is an end view of said unit;

Fig. 3 is a horizontal section taken on the line 3—3 of Fig. 1;

Fig. 4 is a vertical transverse section, the visor being shown in its lowermost position;

Fig. 5 is a fragmentary end view of the interior of the wall box, certain parts being shown in section.

In the particular drawings selected for more fully disclosing the principle of my invention, 10 represents a casing or wall box arranged to be received in an aperture in the wall 11 and provided with a removable face plate 12 secured thereto in any suitable manner as for example, by means of the screws 13 and the lugs 14.

The face plate is provided with an elongated opening 15, along the rearward edges of which are arranged brackets 16 for receiving a diffusion glass 17 to soften the light distribution and prevent the collection of dust within the wall box.

Pivotally connected to the front wall of the casing which in this particular instance is shown as the removable face plate 12, is a visor 18 which is co-extensive longitudinally with the aperture 15 and almost, but not quite, co-extensive therewith transversely. In the present instance said visor is shown as pivoted to the lugs 19 which project from the face plate near the respective ends of the aperture 15 and substantially midway between the upper and lower limits thereof.

When the visor is in its uppermost position as shown in Figs. 1, 2 and 3, the light rays passing from the lamp 20 through the diffusion glass will be reflected downwardly, and when said visor is in its lowermost position, as shown in Fig. 4, said rays will be reflected upwardly. Any suitable means may be employed to maintain the visor in its two positions. In the present instance I have indicated slight projections 21 formed in the respective ends of the visor and co-operating depressions 22 formed in the adjacent faces of the lugs 19, the natural elasticity of the visor which is preferably made of pressed steel causing each said projection to snap into its co-operating recess in order to hold the visor in its adjusted position.

It will be obvious that when my unit is used in a hospital, the patient's bedside table may be illuminated by placing the visor in its uppermost position for administering to the patient without creating a glare in the attendant's eyes; and that when the visor is placed in its lowermost position, a soft indirect light for general illumination is provided without glare.

While various means may be employed for securing the socket 23 to the wall box, I prefer to use the plate 24 to which the socket is attached and which is provided with a slot (shown in Fig. 5) having an elongated portion 25 and an enlarged end portion 26, the screw 27 which takes into the end wall of the casing being small enough freely to pass through the end 26 of the slot, but having a diameter larger than the width of the elongated portion 25. By means of this locking arrangement the socket may conveniently be attached to the wall box and quickly removed therefrom whenever desired.

28 is a switch of any suitable type, for instance, a toggle switch secured to the face plate for controlling the lamp.

Having thus described an illustrative em- bodiment of my invention without however limiting the same thereto, what I claim and desire to secure by Letters Patent is:

A lighting unit comprising in combination a wall box, a face-plate having an elongated opening therein, means for securing said face-plate to said wall box, a visor constructed and arranged to reflect the light downwardly when in its uppermost position and upwardly when in its lowermost position, said visor being co-extensive longitudinally with said opening and with the greater portion thereof transversely, means pivotally connecting said visor to the exterior of said face-plate substantially midway between the upper and lower limits of said opening, and means for maintaining said visor in its uppermost and lowermost positions.

In testimony whereof, I have hereunto subscribed my name this 14th day of May, 1931.

ANTHONY L. McCABE.